United States Patent
Hernvall et al.

(10) Patent No.: US 12,537,808 B1
(45) Date of Patent: Jan. 27, 2026

(54) BANDWIDTH INTENSIVE CHALLENGE-RESPONSE AUTHENTICATION

(71) Applicant: Amazon Technologies, Inc., Reno, NV (US)

(72) Inventors: Emil Anders Hernvall, Vallingby (SE); Vignesh Chockalingam Subramanian, Lynwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 268 days.

(21) Appl. No.: 18/341,371

(22) Filed: Jun. 26, 2023

(51) Int. Cl.
*H04L 9/40* (2022.01)

(52) U.S. Cl.
CPC .............. *H04L 63/08* (2013.01); *H04L 63/10* (2013.01)

(58) Field of Classification Search
CPC ................................ H04L 63/08; H04L 63/10
See application file for complete search history.

(56) References Cited

U.S. PATENT DOCUMENTS

| | | | |
|---|---|---|---|
| 9,426,139 B1* | 8/2016 | McClintock | G06F 21/40 |
| 2017/0366394 A1* | 12/2017 | Kurian | H04L 67/12 |
| 2021/0173907 A1* | 6/2021 | Keith, Jr. | H04L 63/0861 |
| 2022/0126788 A1* | 4/2022 | Hassani | B60R 25/246 |
| 2023/0262082 A1* | 8/2023 | Shah | H04L 63/08 |
| | | | 726/6 |

* cited by examiner

*Primary Examiner* — Gil H. Lee
(74) *Attorney, Agent, or Firm* — Hogan Lovells US LLP

(57) ABSTRACT

Approaches presented herein relate to human authentication in a computerized environment. In particular, challenge-response authentication can be performed where a requestor must submit a correct and valid response. An automated attack on such an environment may use a proxy network to cause a large number of malicious requests to be received to the environment, over a period of time, that appear to come from different sources. To make such an attack less appealing, challenge-response authentication can require an amount of additional data to be transmitted with each request, where that amount is small enough to not have a significant impact on a single request from a legitimate user, but large enough that the amount of data to be transmitted when aggregated across a large number of malicious requests will be significant, resulting in a high cost to the attacker if the proxy network provider charges based on data transmission.

20 Claims, 7 Drawing Sheets

BANDWIDTH INTENSIVE CHALLENGE-RESPONSE AUTHENTICATION

BACKGROUND

For many providers of network-based resources or services, there is a consistent need to attempt to detect and prevent, or at least mitigate, cyber-attacks. As an example, a "botnet" attack can occur when one or more networked computing devices execute (often unknown to a user or operator of the device) automated scripts that can cause requests or calls to a given address, or range of addresses, to be transmitted over a relatively short period of time. While some botnet attacks attempt to infect computing devices with malware or otherwise manipulate those devices, or applications or services hosted by those devices, other attacks can attempt to harvest tokens or disrupt a service or content provider network, such as by overwhelming the system with a large volume of fraudulent requests over a relatively short period of time. These requests often mimic human behavior and may appear to be legitimate requests submitted by legitimate users, which makes them difficult to detect and manage properly. The sheer number of degrees of freedom available to a malicious actor make it nearly impossible to detect and prevent all possible forms of attack. Further, the inability to quickly detect and block these requests, or prevent them from being received in the first place, particularly at high volume, can still disrupt the availability or performance of the resources or services associated with a target of the attack.

BRIEF DESCRIPTION OF THE DRAWINGS

Various embodiments in accordance with the present disclosure will be described with reference to the drawings, in which.

DETAILED DESCRIPTION

Approaches described and suggested herein relate to human authentication in a computerized environment. In particular, various embodiments can perform challenge-response authentication for a user, client, source, or other requestor requesting access to one or more computing or electronic resources, or requesting a task to be performed that involves such access. In a challenge-response authentication process, a challenge question is issued, or challenge task proposed, and the user (or other requestor) must submit a correct and valid response, such as a correct answer to a challenge question or a successful completion of a challenge task that should be relatively easy for a human user to complete but relatively difficult for a bot or script to complete accurately in a relatively short period of time. The human authentication process may be used in addition to an identity (or other such) authentication process. It often can be difficult to detect or identify when a received request is one of a number of malicious requests that may be received as part of a bot attack or other such undesirable activity. In many instances, an attacker (which may take the form of one or more bots or automated scripts) may use a proxy network to cause a large number of requests to be transmitted to an address, or range of addresses, that appear to come from different sources. In order to make such an attack less appealing to a potential attacker, a challenge-response authentication process can be performed that can require an amount of additional data to be transmitted for an individual challenge. The amount can be small enough that it will not have a significant impact on a single request from a legitimate user, but large enough that the amount of data to be transmitted across a large number of malicious requests will be significant. In many instances, providers of proxy networks charge by the amount of data transmitted, such that a significant amount of additional data to be transmitted can quickly result in very large costs incurred by the attacker, which can make such an attack less desirable for at least certain types of attacks. The amount of additional data to be transmitted can be determined based on a number of factors, such as a reputation score or level of suspicion, and the data transmitted can also have an expected value to be verified to further increase the level of security of the authentication process.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
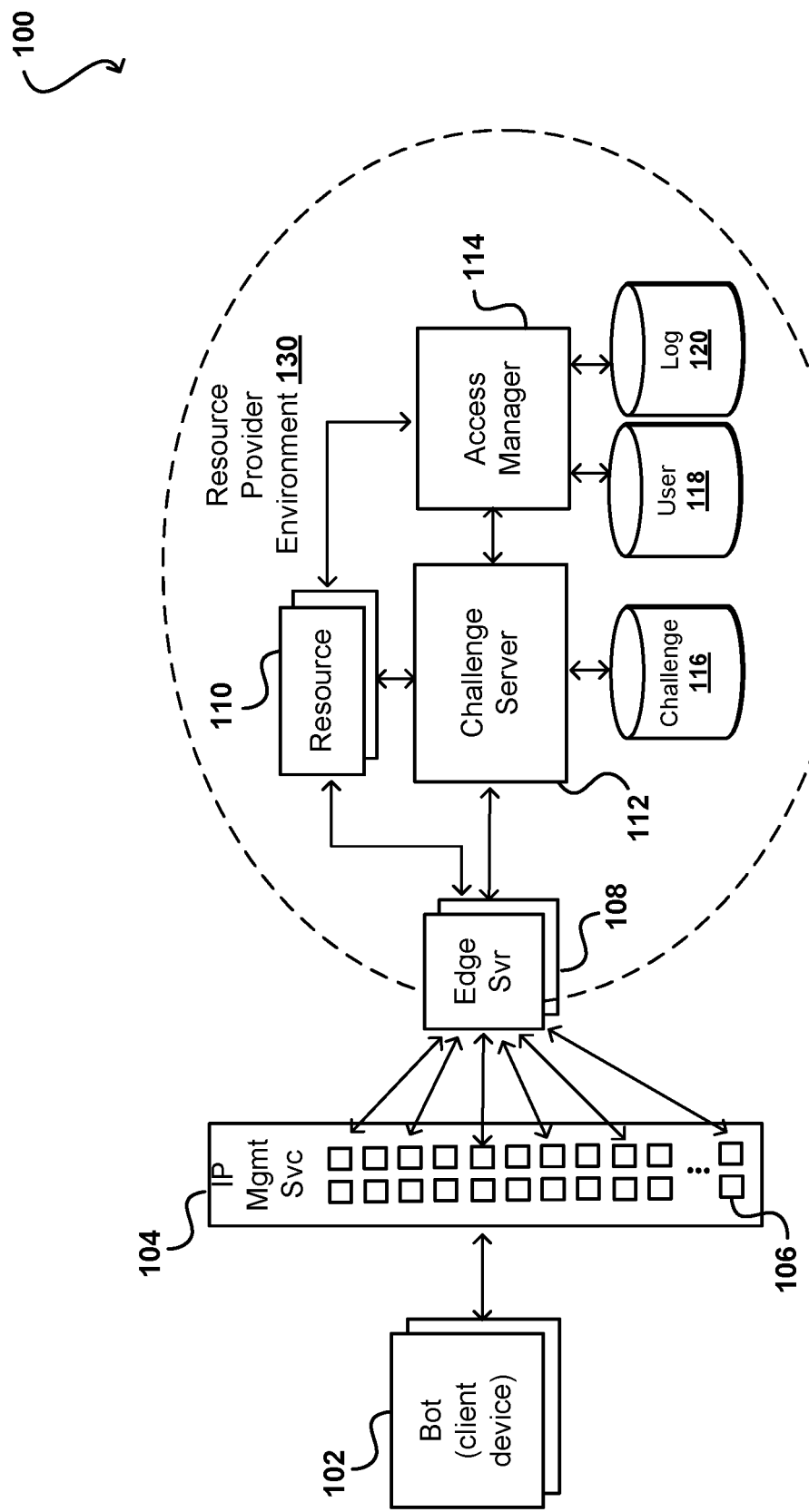
FIG. 1 illustrates a system to manage access to resources that can be used in accordance with various embodiments.

FIG. 1 illustrates an example system 100 that can be used to provide network-based access to computing resources or services according to at least one embodiment. As for various network or cloud-based offerings, users can obtain access to various computing resources 110 provided by a resource (or service) provider from a resource provider environment 130. In many instances, a user can use a client device 102 to submit requests across at least one network, such as a cellular network or the Internet, that can be received to an address or interface (such as an application programming interface (API)). For at least a first request from a client device 102 for a given session, an access manager 114 can analyze information in, or associated with, the request to attempt to authenticate a user and determine whether the user, or client device associated with the user, is authorized to access a resource or service that is associated with a target of the request. This may include, for example, analyzing a credential (e.g., a username and password pair or secure token) included with the request and comparing that information against information stored for that user in a user repository 118 or other such location. Once a user is authenticated and determined to be authorized for the requested access, the user and/or associated client device 102 can be allowed to access one or more resources, or interact with one or more services hosted using those resources, in order to have the request processed or otherwise handled. A response or other action can then be taken in response to such processing.

As mentioned, there are various automated attacks that may be launched against, or malicious requests that may be received to, one or more addresses or interfaces of such a resource provider environment. In at least some instances, these attacks may have obtained credentials that enable access to be granted to various resources. In order to attempt to prevent access being granted to automated scripts or "bots," or other unauthorized, non-human sources or requestors, a challenge server 112, service, or process can be used to perform challenge-response authentication for at least some requests, or types of requests, received to at least certain addresses or interfaces associated with the resource provider environment. A challenge server 112 can perform such authentication using any of a number of different protocols or approaches to provide a "challenge" to a requestor, where that challenge can take the form of a question to be answered or task to be performed, among other such options. There may be various challenges of one or more types from which the challenge server may select at random, or according to a selection algorithm or other such mechanism (e.g., machine learning), from a challenge repository 116 or other such source. A requestor receiving such a challenge in at least one embodiment must then provide a valid response to the challenge in order to successfully complete the challenge, such as to provide the correct (or at least expected) answer to the question or to successfully perform the task. If a valid response is provided or otherwise determined then the requestor can be authenticated as a human user, at least with a minimum degree of confidence or certainty. If an identity of the requestor has been otherwise authenticated, such as by using a password or token as discussed previously, then the requestor can be granted access, or otherwise have a request processed using resources for which authentication was required. If the challenge is not completed successfully then various actions can be taken in various embodiments. In one example, access may be prevented for the requestor for at least a period of time, or the address, browser, or device from which the request was received can be blocked. In at least some embodiments, a requestor may have more than one chance to successfully complete a challenge, such as to account for the fact that the user may have made a mistake or not remembered or known the answer to provide, or may not have been able to successfully complete a task for a legitimate reason. In such cases, additional challenges may be provided, up to a maximum number of challenges for a given session to reduce the likelihood of an automated script successfully guessing a response or randomly performing a task. If a maximum number of challenges have been failed for a requestor on a given session, then an action can be taken as mentioned. In some embodiments, a difficulty of the challenge may be altered for different attempts, such as where a difficulty level may increase in response to a failed attempt or invalid response.

The use of such a challenge-response authentication approach can help to minimize the ability of a bot or automated script from gaining access to resources or services offered by a resource provider. Unfortunately, such an approach will typically not be able to limit the number of such requests received over a given period of time that need to be evaluated with such authentication, which can still negatively impact the performance or availability of resources or services secured using that authentication. Being able to block requests from a given address or device can help reduce this processing, but botnet attacks often use Internet protocol (IP) management services 104, or other such mechanisms, providers, or third-party proxy networks, to obtain a large number of addresses 106 or interfaces for a relatively short period of time. By being able to submit requests that appear to come from many different devices or requestors, a botnet attack can minimize the impact of address blocking by using an overwhelming number of IP addresses to send the requests. Using such an approach, a single bot on a single client device 102 (or on multiple infected or controlled devices) can launch an attack that appears to submit legitimate requests from a large number of unique devices or addresses, such that blocking of one of these addresses may have little to no impact on the other requests sent as part of the attack.

Accordingly, approaches in accordance with various embodiments can attempt to perform challenge-request authentication in such a way that the transmission of a large number of unique requests becomes prohibitively (or at least undesirably) expensive for a potential attacker. In at least one embodiment, requests received from external addresses 106 to a resource provider environment 130 can be processed by an edge server, or at least one server or computing resource located at the edge of a provider network or environment. In other embodiments, the requests can be processed directly by a challenge server 112 in the environment or other such resource, rather than processing at the network edge, although using various edge servers 108 can help to avoid bottlenecks when processing large numbers of requests. When the edge server 108 receives a request, that edge server can issue a challenge to the requestor, or source of the request, that involves transmission of a not-insignificant amount of data. In many instances, an IP management service 104 charges for use of the various allocated addresses 106 based on the amount of data transmitted through each address. Accordingly, requiring a large amount of data to be transmitted to successfully respond to a challenge can quickly drive up the price for each unique request. For an attacker who is attempting to use a large number of unique addresses to submit unique requests, this can result in a very large charge or incurred overall cost. It is intended that such high cost to launch such an attack will make these attacks less desirable to perform for a given attacker, such that the number of such attacks can be greatly reduced.

When determining the amount of extra data to be transmitted, however, it will often be important to ensure that the amount of data is not so large for any given request that legitimate users or requestors are unacceptably penalized. For example, a legitimate human user may submit a request using a smartphone or tablet computer where the request is sent over a cellular network, and the user may be charged based on the amount of bandwidth used or data transmitted. The amount of data to be transmitted per challenge response should then be set, in at least one embodiment, so that the extra incurred cost for a legitimate user is negligible, or at least insignificant, but significant for an attacker when accumulated over a large number of requests. The amount of data can be configurable, and may vary based upon a number of different factors, such as a location of the requestor, a type of request or service, a level or type of user account available, or other such factors. The amount of data may also change for different circumstances as discussed in more detail elsewhere herein, such as where the probability of an attack occurring increases, or where more than a threshold number of failed requests is received over a period of time, among other such factors. The type of challenge can also be selected or modified over time to minimize the number or rate of additional false positives that might be incurred for legitimate users or requestors. Customers of a resource provider, for example, may be willing to have a slightly higher rate of false positives, slightly slower response due to data transmission time, and some small additional bandwidth impact, in order to be able to ensure a safer system with more protection in place for bot mitigation and other such malicious activity.

Figure 2:
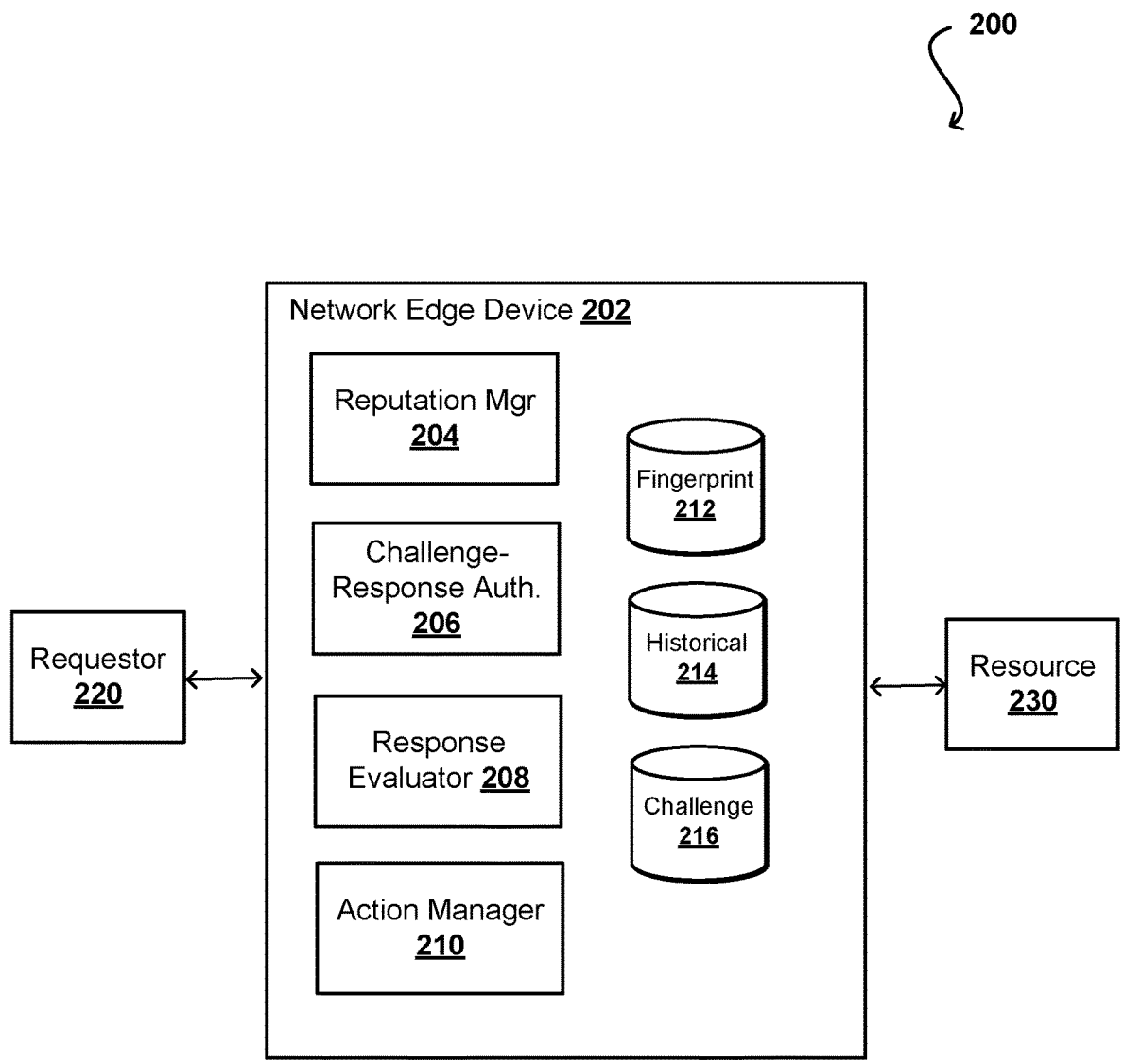
FIG. 2 illustrates an example network edge device that can be used to perform challenge-response authentication in accordance with various embodiments.

FIG. 2 illustrates an example network edge device 202 that can be used as part of an authentication system 200 according to at least one embodiment. As mentioned with respect to FIG. 1, a network edge device can host a challenge-response authentication module 206, or perform an authentication process, for requests from requestor devices 220 to access or utilize one or more secured resources 230. As mentioned, there may be multiple edge devices used to process incoming requests, in conjunction with a challenge manager for a network or environment. In some embodiments, there may be resources provided in multiple regions, where each region includes its own challenge server in communication with one or more associated edge devices for each region. Such an approach can help with latency of processing, by being in closer proximity to requestors, but can also allow for different types of challenges to be issued in different locations, such as may comply with different laws or regulations about data collection or export, etc.

In at least one embodiment, a challenge-response authentication module 206 can use a computation challenge, such as a hashcash-based proof-of-work computation challenge. Hashcash is a proof-of-work algorithm, which can be used as a denial-of-service countermeasure technique in a variety of different computing systems. As part of such an authentication process, a hashcash stamp can constitute a proof-of-work which takes a parameterizable amount of work to compute for the sender. A recipient can verify received hashcash stamps relatively efficiently, which can help to reduce the likelihood of the creation of a bottleneck in the event of a botnet attack. In at least one embodiment, computation challenges can be issued that require large values to be returned in the response, which can thus increase the amount of data to be transmitted. As part of an advanced bot control feature, for example, other types of challenges can be used that can be more bandwidth intensive. As mentioned increasing the required bandwidth for challenge and/or response transmission can aim to increase the cost of utilizing proxy networks that typically charge for bandwidth as their pricing models are heavily skewed toward ingress/egress of network traffic. As mentioned, such an approach can also help to reduce the cost benefits of mining tokens for bot networks.

In at least one embodiment, a challenge-response authentication module 206 can determine when to require a requestor to download and/or upload an extra amount of data, as well as to determine the amount of extra data to be transmitted. This may include determining an amount of extra data that a requestor must download in order to obtain an access token that grants access to one or more resources, services, or other such offerings. Such a module can also implement one or more guardrails that attempt to deter a requestor from attempting to cheat the system when an expensive network challenge is required for each submitted request.

In at least one embodiment, a challenge-response authentication module 206 can determine the type of challenge and/or the amount of additional data to be transmitted based at least in part on a level of suspicion for a determined request. In some embodiments, a level of suspicion might be determined generally, such as where a number of invalid requests received over a period of time indicated the probability of a current bot attack. In at least one embodiment, a challenge-response authentication module 206 can work with a reputation manager 204 on (or off) the network edge device 202 to attempt to determine a level of suspicion based in part upon a reputation associated with a given requestor. For example, when a first overall request is received from an address, such that there is no historical information or proof of valid human presence, a medium level of suspicion might be determined where a requestor might be required to submit more data than for a valid user, but not so much as to unnecessarily penalize a legitimate user. For addresses for which there is a lot of legitimate history stored in a historical data repository 214 or other such location, a strong or solid reputation score or value may be determined that may result in little to no additional data being required for a requestor associated with this particular address, and may result in a simple challenge being provided, such as to click a box or select a single graphical element. For addresses for which there is a pattern of questionable or suspicious behavior, a poor or low reputation score or value may be assigned, which may require a significant amount of additional data to be transmitted, as well as a difficult challenge to be selected from a challenge repository 216 or other such source. If a reputation score drops below a minimum value or a reputation type becomes unacceptable then that address might be blocked or another remedial action taken, such as to require contact with the requestor before allowing subsequent access to at least certain resources or services.

In some embodiments, the reputation score can be determined for a specific device, browser, or interface rather than a specific address. This can be beneficial when an attack is being launched that submits multiple requests from a single device that, through use of a variety of addresses from a proxy network, appear to come from different devices. In at least one embodiment, a fingerprint may be generated for a specific device that is indicative of various settings, configurations, capabilities, components, versions, or other such aspects of a particular device. While fingerprints may not be unique, they may be different enough due to the wide variety of possible combinations that few requestors of a service provider will have similar fingerprints, such that requests received from different addresses but associated with the same fingerprint can be quickly identified and associated with a single or at least small number of requestors. If multiple invalid requests are detected that correspond to the same fingerprint, then a reputation value associated with that device can be lowered, or a level of suspicion increased, with a challenge and amount of additional data to be transmitted being selected accordingly. In one embodiment, a requestor with a strong reputation may not be asked to transmit any additional data, or less than a few MB of data. As the reputation lowers or level of suspicion increases, requestors might be asked to upload 10 MB or more with each request, which can result in significant costs across hundreds or thousands of sessions each having at least one such request submitted.

In at least one embodiment, a requestor transmitting a response to a challenge can be asked to transmit a certain number of 0 (or other) value bytes with the challenge response. The number of 0 values to be included can be determined by the authentication module based on factors such as number of prior failed attempts, reputation, and/or level of suspicion. While such an approach can be simple to implement, it may not be optimal as there may be situations where a compressed payload can be transmitted, and compression of a payload consisting of all zero values would compress down significantly and thus avoid the intended excess transmission charges. Accordingly, an approach in accordance with another embodiment can require an amount of randomly, semi-randomly, or non-randomly selected bytes (or other measures) of data to be uploaded. An advantage of using random data is that as a fundamental property random data is not compressible. In some embodiments, the data can also be selected at random based on a shared seed or by using a shared random number generator, such that the value itself can also be validated, which makes it more difficult in addition to more expensive to submit a malicious request to be validated. In at least one embodiment, an expected bitstream can be constructed on the edge device and compared against the received bitstream to determine whether the values are the same.

In at least one embodiment, a challenge can be issued in the form of a signed digital envelope, with the signature being provided for subsequent authentication that the challenge was issued by the edge device or another such authorized source. A seed can be supplied in that digital envelope that is to be used with a random number generator to generate the required data value. The digital envelope can also include the challenge and indicate any required information that is to be returned with the challenge response. In at least one embodiment, the opening of the envelope and processing of the challenge information can be performed in JavaScript in a browser or similar interface for Web-based communications. A response envelope can be generated that includes the response to the challenge, as well as the generated random number and the seed, that can be returned to the edge device 202 for evaluation, such as through use of a response evaluator 208 that can work with the authentication module 206. In some embodiments, the seed may be retained on the edge device and not required to be sent back with the response. In addition to determining that a correct and/or valid response was returned for the issued challenge, the evaluator can determine that the received random value matches (or has the same value as) the expected random value, byte per byte. If the challenge response and random number are both as expected, then the requestor 220 can be authenticated as corresponding to a human user and not a bot, automated script, or other unauthorized entity. If either is incorrect, then a failed challenge process can be performed by the challenge-response authentication module 206. The challenge-response authentication module can also work with an action manager 210 to determine one or more actions to take in response to an invalid response. This might be to issue another challenge, which may be difficult or longer in scope, or to perform another action such as to deny the request, block an IP address, blacklist a device fingerprint, or lock a requestor account, among other such actions.

A reputation score or value, or a level of suspicion, can be determined in a number of different ways. A resource provider can attempt to obtain data for, or monitor the behavior of, an address, user, or client with respect to various sites, resources, or services. This behavioral data can then be processed using, for example, a rule- or algorithm-based process that can take this data as input an calculate a reputation or suspicion score. In at least one embodiment, a trained machine learning model or deep neural network can take at least some of this data as input and attempt to infer a level of suspicion or reputation score. A machine learning approach can also monitor activity across all users to attempt to infer a likelihood of an ongoing bot attack, which can raise a level of suspicion across all potential incoming requests, or at least those with less than a strong reputation score. Each instance of a failed challenge response (or even a successful challenge response) can be logged, and may be stored as historical data in a historical data repository 214 for use in future reputation determinations performed by a reputation manager 204 or other such module, component, or process.

In some embodiments, the data transmission to be modified may depend at least in part upon the way in which a requestor would be charged in a given system. For example, a provider might send additional data with the challenge question that causes the requestor to incur download charges if that is how a third party proxy network provider charges. For a download option, the server or edge device might generate random data and a unique hash of that data. In at least one embodiment, predefined data can be stored in the resource provider environment, such as in a data storage bucket. A requestor can receive a link to download the data needed for the challenge from this bucket. When the data is downloaded by the client or requestor, the requestor can compute a hash or checksum of that data to send back to the server or edge device for validation. Such an approach requires the challenge provider to transmit additional data as well, which may be undesirable as it may cause the provider to incur additional compute and transmission cost. In some embodiments it might therefore be preferable or at least desirable for the requestor to have to upload the additional data, which can result in additional cost and latency for the upload for the requestor, but would not cause the provider to incur any outbound transmission charges.

Figure 3:
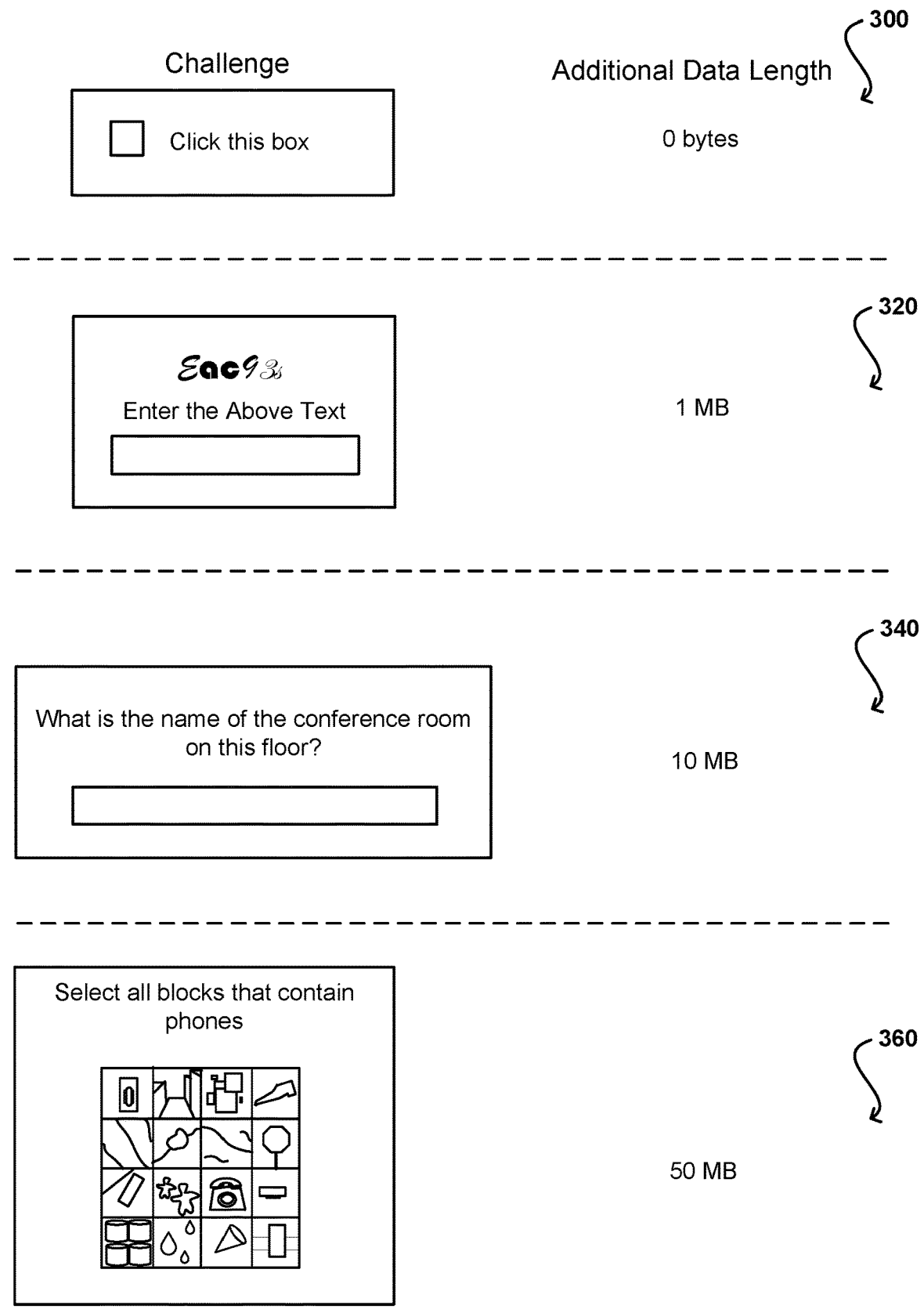
FIG. 3 illustrates example challenge tasks that can be selected in accordance with various embodiments.

In at least one embodiment, there may be different types of challenges issued based upon factors such as reputation or level of suspicion. Different types of challenge questions or tasks may also be associated with different types of users or access, as may depend at least in part upon the security level of the requested access, where certain types of challenges may have greater or lesser associated levels of difficulty. In some embodiments, different challenges of different levels of difficulty may also be presented based at least in part upon a number of failed retries, or other such factor. In at least one embodiment, the amount of additional data to be transmitted may also vary based upon the level of difficulty or suspicion, reputation, etc. FIG. 3 illustrates different challenge questions or tasks that can be used in accordance with at least one embodiment. These are merely examples, and any task that may be relatively simple for a human user to quickly perform but relatively difficult for a computer or automated script to perform can be used as well in various embodiments.

In a first challenge example 300, a relatively simple challenge is issued that simply requires a human to click a box or select a specified graphical element. Such a simple challenge may be issued for a user, device, or account that has a strong reputation, a lot of historical data, and a very low level of suspicion. For such a challenge, there may be no additional data requested to be transmitted. Such an approach would likely not be used for a new user or account, but only where at least some level of trust has been established. While clicking on the box is relatively simple for most human users, such a task is not necessarily straightforward for an automated script, particularly if the challenge is presented in a window or frame generated from a separate source or service.

In a second challenge example 320, a slightly more difficult challenge task is proposed. In this example, which might be issued for a slightly higher level of suspicion or lower reputation level, a user may be asked to enter letters that are displayed in a somewhat unconventional way, such as a complicated script or with at least partial obscuring or additional elements that would make it difficult for an automated character recognition process to identify and enter the appropriate characters. For such a higher level of difficulty, the user may be asked to also upload at least some amount of additional data, such as at least 1 MB in this example. As illustrated, the amount of additional data to be transmitted and the difficulty of the challenge task can depend upon various factors, where legitimate users with a history of good behavior are more likely to get less complicated challenges with little to no additional data transfer requirement, while suspicious users, clients, or addresses without strong history or solid reputations are more likely to get more difficult or complex challenges with larger amounts of additional data required to be transferred, in order to make it harder and more expensive for a bot or automated script.

Other types of challenge tasks can be selected as well, as illustrated in the final two examples 340, 360 of FIG. 3. In one challenge task, a question is asked that will be difficult for anyone or anything other than a specific user to answer, as may relate to a personal question and answer, an agreed upon challenge question, and the like. An automated script will often not have access to the information needed for a valid response. In another example, a user must identify (within a reasonable amount of time) a number of blocks or squares that contain items of a specific type, among other such options. Such image analysis can be difficult for an automated process to do quickly and accurately. As illustrated, the amount of additional data to be transferred can be increased with level of difficulty, although different amounts of data may be required for the same type of challenge task in at least one embodiment. In at least some embodiments, the type(s) of challenge tasks to be issued can be configurable, as well as the criteria to be used to select each of those types. A provider can also select or provide rules to determine an amount of additional data to be required in certain circumstances, among other such factors. In some embodiments, the difficulty may be based upon a combination of factors, such as a reputation score, a current level of suspicion, and a number of failed challenge responses in a session, among other such options. In some embodiments, a response to a failed challenge may be returned with a token that indicates that the response attempt failed, as well as a number of failed attempts on a session, so the appropriate challenge can be selected for an additional attempt, or an action can be taken if a maximum number of retries has been reached. Various amounts of additional data can be selected, as may include 100 KB, 1 MB, 10 MB, or 100 MB, among other such values. As mentioned the values can be selected so as to not provide a cost burden for legitimate users, but be high enough to deter attackers relying on many different transmissions as part of an attack or activity.

Figure 4:
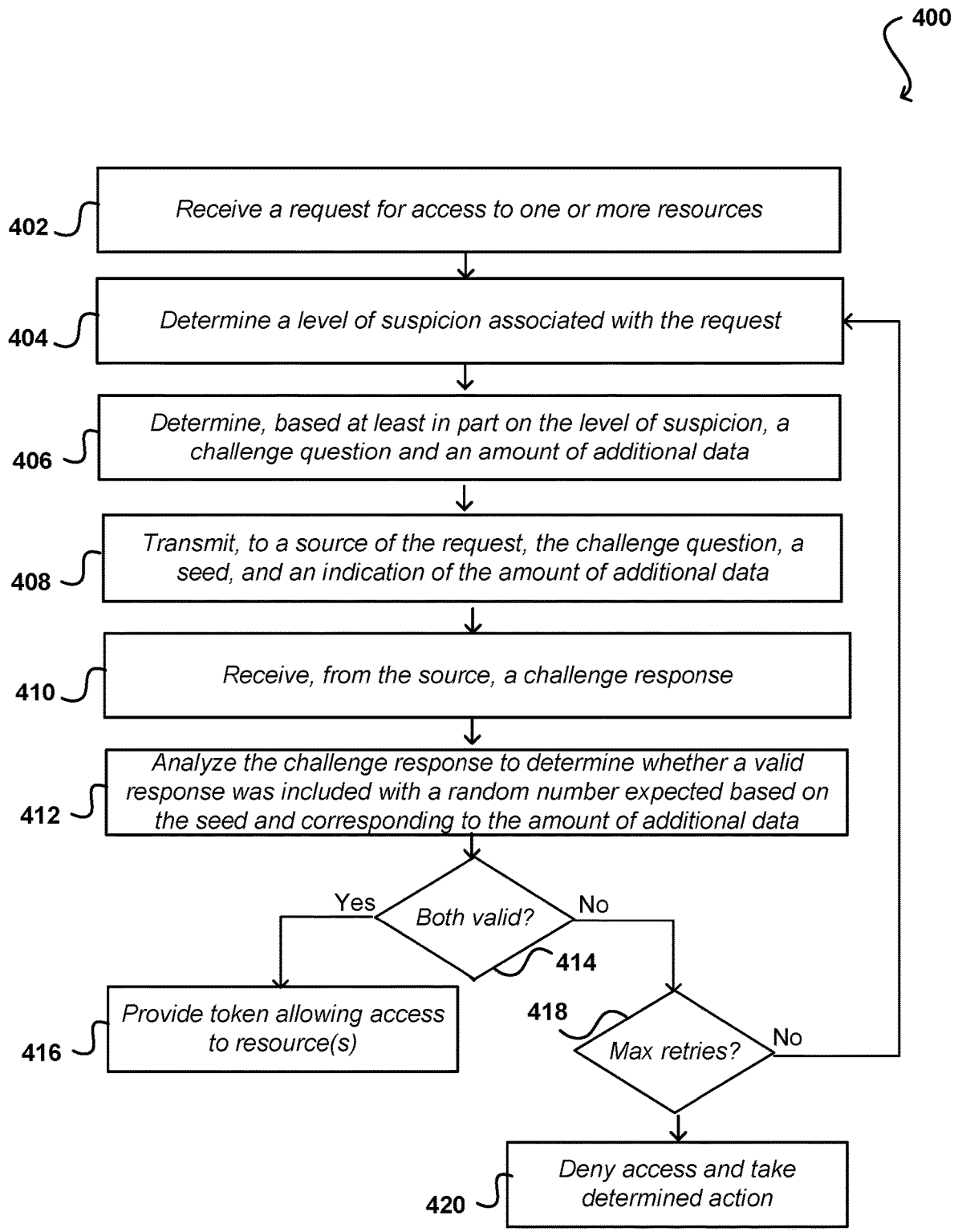
FIG. 4 illustrates an example process for challenge-response authorization that can be performed in accordance with various embodiments.

FIG. 4 illustrates an example process 400 for performing challenge-response authentication that can be used in accordance with at least one embodiment. It should be understood that for this and other processes discussed herein that there may be additional, fewer, or alternative steps performed in similar or alternative orders, or at least partially in parallel, within the scope of the various embodiments unless otherwise specifically stated. Further, although this process is described with respect to a random number generated from a seed and compared against an expected value, any appropriate type and amount of additional data can be transferred as well in accordance with at least one embodiment, where the value transmitted may or may not be compared against an expected value. In this example, a request is received 402 for access to one or more resources. This could include a request for one or more specific resources, or types of resources, or could involve performance of a computation that may use such resources or types of resources, among other such options. The resources may be specific resources, or selected from a pool of available resource capacity of one or more resource types.

In this example, the request can be analyzed, such as by an edge server receiving the request. The analysis can include obtaining additional information associated with the request. For example, information in the request can be used to determine a sending address, as well as any related or historical information associated with the request or address, such as may correspond to past behavior or activity on a current session. Based at least in part upon this or other such information, a level of suspicion associated with the request can be determined 404. A level of suspicion can be based upon information for the request itself, such as a reputation or past behavior of a user or client associated with a sending address, as well as other information such as a threat level across other requests from other addresses received over a period of time. Other values, such as a suspicion score, reputation score, threat level, threat categorization, or other such value can be determined as well within the scope of various embodiments. Based at least in part upon the level of suspicion or other such value or metric, a type of challenge question (or task) can be determined 406, as well as an amount of additional data to be transmitted with a response to that challenge question. The type of challenge question can be selected based upon the level of suspicion, for example, such that more suspicious requests can be more likely to receive more difficult challenge tasks in at least one embodiment. In this example, the level of suspicion can be used to determine an additional amount of data to be transmitted, where the amount to be transmitted can increase (as a continuous or step function, over a number of intervals, or otherwise) as the level of suspicion increases.

Once a type of challenge question is selected, along with an amount of additional data to be transmitted, a challenge question of that type can be selected and transmitted 408 to a source of the request. The challenge request in this example can include a seed and specification of an amount or length of additional data to be returned. For example, the seed may be provided to be used with a random number generator to generate a random number of a specified length, to be transmitted with a response to the challenge question. A copy of the seed, or a random number generated using the seed, can be maintained on, or accessible to, the edge server for subsequent validation.

A challenge response can subsequently be received 410 from the source of the original request for access. If a response is not received within a determined amount of time then the challenge attempt can be determined to have failed. If received within the allowed amount of time, the challenge response can be analyzed 412 to determine whether a valid response to the challenge request was included. This can include, in this example, a valid response to the challenge question, such as an expected answer or expected completion of the indicated task. This can also include a random number of the specified length that has an expected value based on the provided seed. In some embodiments, it may be sufficient that additional data of the specified length is received without verifying the value included in the additional data. A determination can be made 414 in this example as to whether the challenge response and the additional data value were both valid and as expected. If so, a token can be provided 416 to the source of the request (or another identified recipient) that will allow or provide access to the resource(s) on a subsequent request, which can be directed through the edge server or may pass directly to an interface associated with the resources. If at least one of the challenge response or additional data value is not valid or as expected, then a determination can be made 418 as to whether a maximum number of retry attempts has been reached. This value may be configurable, and may be fixed or determinable based upon various factors, such as a reputation score or level of suspicion. In some embodiments, a default maximum retry value such as two or three retry attempts can be performed within a determined amount of time, or on the same session. If the maximum number of retries has not yet been reached then the process can continue, with an updated level of suspicion potentially being determined based upon a failed challenge response. Data for each failed attempt can be written to a log or historical data repository in at least some embodiments, which can help to determine a reputation score or value for the user, client, or source. If a maximum number of retries has been reached then the requested access can be denied 420, and in this example at least one determined action can be taken. The action may depend at least in part upon the circumstances, such as the level of suspicion or reputation in the event of a maximum number of challenge failures. In some instances, such as where there is a low level of suspicion or a strong reputation, a notification may be provided indicating that the access is locked for a period of time but that the user can try again later. In other situations, other actions might be taken such as to block an address, blacklist an address or user, generate an alarm, or raise a system-wide suspicion level, among other such actions.

Figure 5:
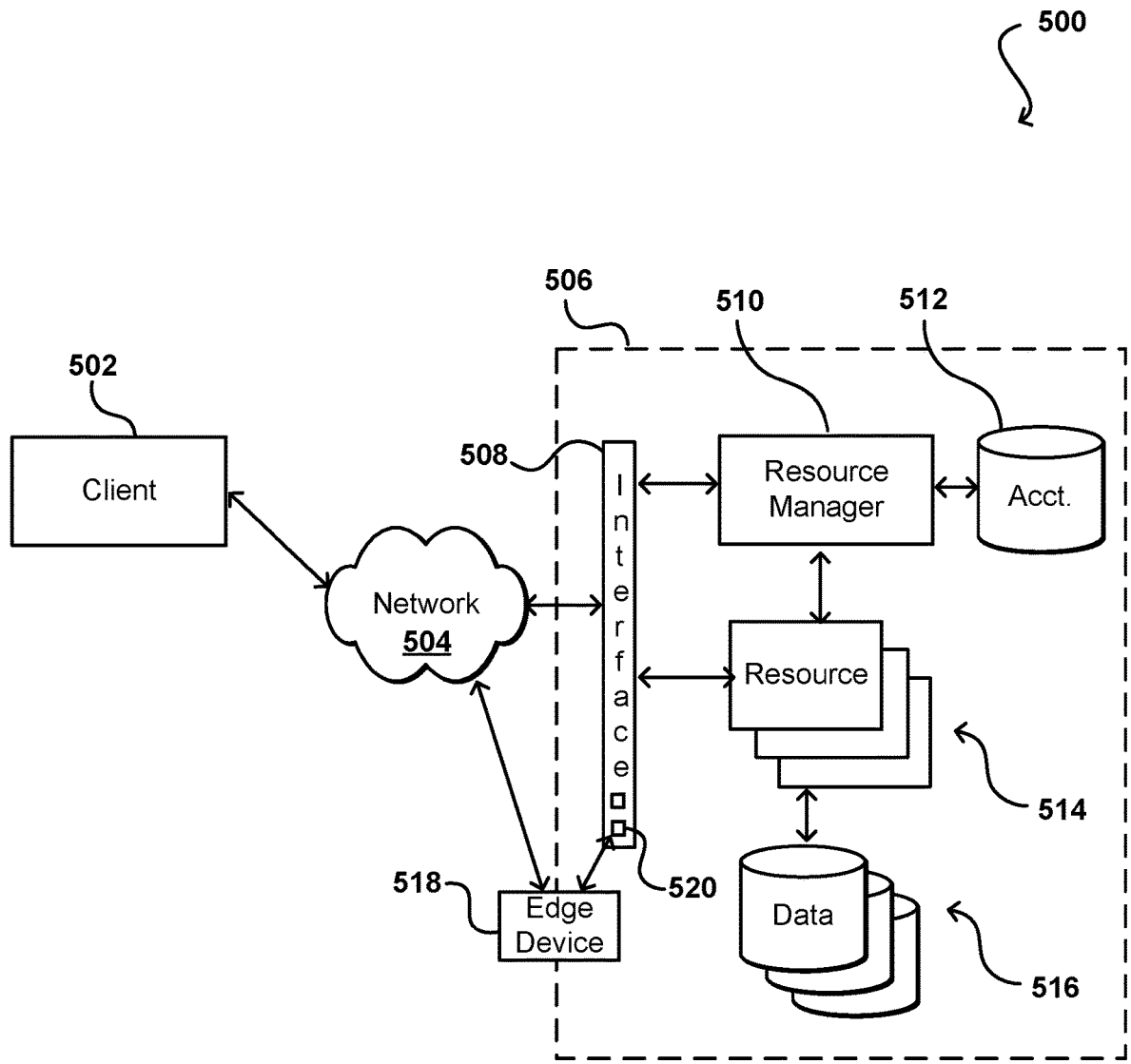
FIG. 5 illustrates an example network-inclusive computing environment in which
aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. For example, the provider environment 506 can be a cloud environment that can be used to provide cloud-based network connectivity for users, as may be used during disaster recovery or network optimization. The resources may also provide networking functionality for one or more client devices 502, such as smartphones that may be able to connect to one or more network(s) 504, or may be used to perform network optimization tasks as discussed herein.

In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

In at least one embodiment, at least some authentication can be performed by an edge server 518 sitting at the edge of the provider environment 506 or associated provider network. As disclosed herein, a network edge device can receive a request from across at least one network 504 and analyze that request to determine whether authentication is required. This may include, for example, performing challenge-response authentication whereby the edge device 518 selects an appropriate challenge question or task to provide to the source of a request, and a valid and correct response must be received in response to the challenge question or task in order for that request to be processed, such as to receive a token to allow access to one or more of the resources 514 in the provider environment 506. In order to attempt to make bot or automated script attacks less desirable, such a challenge may also request additional data to be transmitted, which can increase the cost of each such transmission and thus make an attack that requires many such transmissions be undesirably costly for a potential attacker. The amount and form of the additional data to be transmitted can be based at least in part upon various factors, such as a reputation of the source or a current level of suspicion, among other such factors.

Once a user (or other requestor) is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
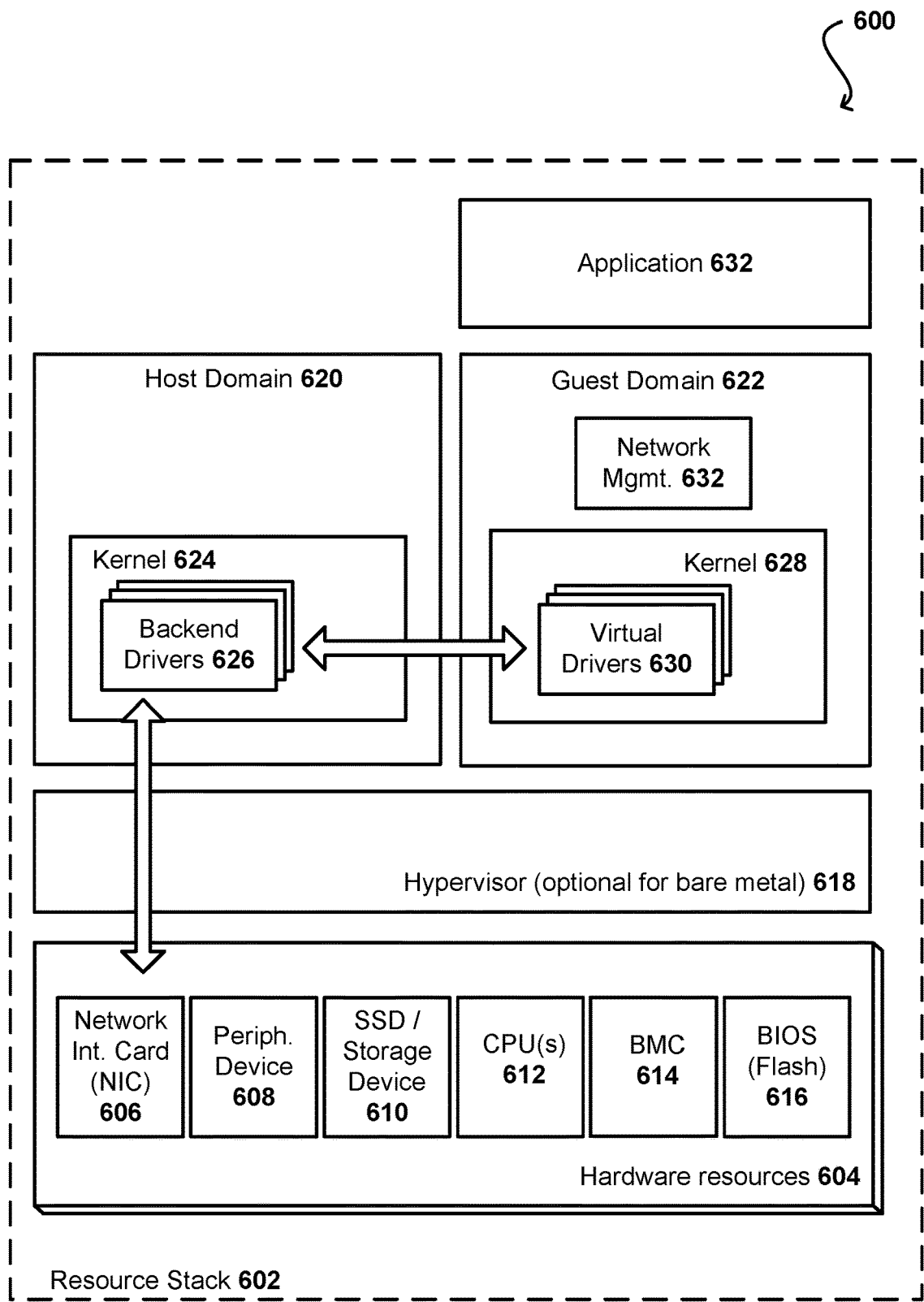
FIG. 6 illustrates example components of a server that can be utilized to perform at least a portion of a network management process, in accordance with various embodiments.

FIG. 6 illustrates an example resource stack 602 of a physical resource 600 that can be utilized in accordance with various embodiments, such as may be provided as part of a provider environment such as that illustrated in FIG. 5. When performing tasks, such as network optimization or re-routing using a network management module 632, for example, such resources can include components such as CPUs 612 for executing code to perform these tasks, NICs 606 for communicating network traffic, and memory for storing instructions and networking data. In some embodiments, an entire machine may be allocated for these tasks, or only a portion of the machine, such as to allocate a portion of the resources as a virtual machine in a guest domain 622 that can perform at least some of these tasks.

Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
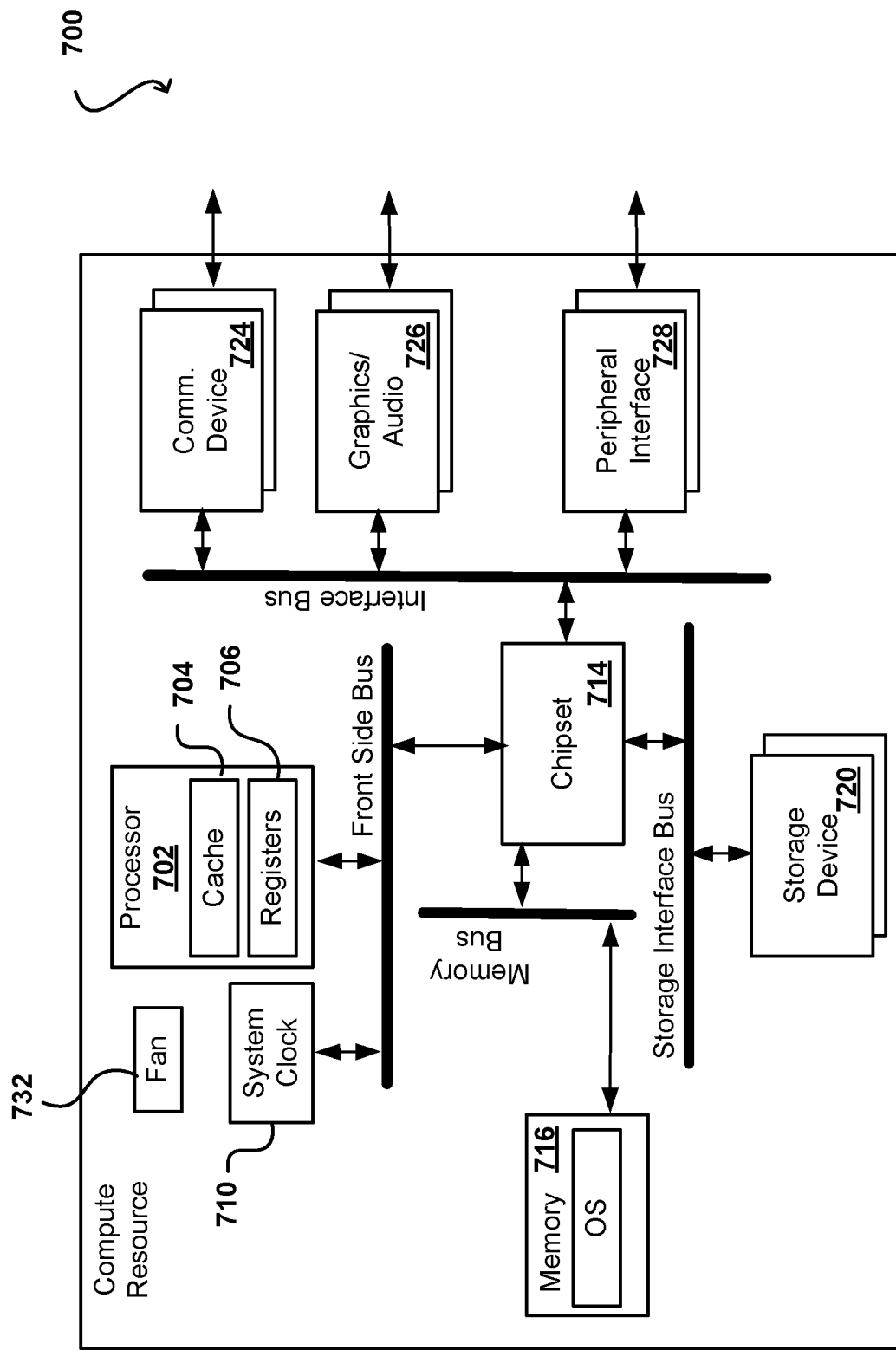
FIG. 7 illustrates example components of a computing device that can be used to implement network monitoring and management aspects of various embodiments.

Computing resources, such as servers, smartphones, or personal computers, will generally include at least a set of standard components configured for general purpose operation, although various proprietary components and configurations can be used as well within the scope of the various embodiments. As mentioned, this may include client devices for transmitting and receiving network communications, or servers for performing tasks such as network analysis and rerouting, among other such options. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a requestor, a request for access to one or more resources in a resource provider environment;
determining a reputation score for the requestor;
selecting, based upon the reputation score, a challenge task and a specified length of additional data, wherein the additional data is to be transmitted with a challenge response to the challenge task;
sending, to the requestor, the challenge task, an indication of the specified length of additional data to be transmitted with the challenge response, and a seed value to be used to generate the additional data;

receiving, from the requestor, the challenge response;

analyzing the challenge response to determine whether the challenge task was successfully performed;

determining whether the additional data was received having the specified length and whether the additional data included an expected data value generated using the seed value; and authenticating the requestor as a human user based upon the challenge task being successfully performed and receiving the additional data having the specified length and the additional data including the expected data value.

2. The computer-implemented method of claim 1, further comprising:

selecting the specified length of additional data to be transmitted based upon a reputation score of the requestor or a level of suspicion associated with the request.

3. The computer-implemented method of claim 1, further comprising:

selecting the specified length of additional data to have a negligible impact on a legitimate human requestor submitting a single request on a session but a significant impact in aggregate on an automated requestor submitting a large number of concurrent requests.

4. The computer-implemented method of claim 1, further comprising:

allowing the requestor up to a maximum number of retries to successfully perform at least one challenge task, wherein the requestor is required to transmit a specified length of additional data for each retry, and wherein the specified length of additional data is allowed to increase with each respective retry.

5. The computer-implemented method of claim 1, further comprising:

increasing a difficulty of the challenge task selected for at least one retry attempt.

6. A computer-implemented method, comprising:

receiving a request to perform an operation using at least one computing resource;

transmitting, to a source of the request, a challenge task to be performed and an indication of a specified length of additional data, wherein the additional data and an indication of performance of the challenge task are to be transmitted as a response for the challenge task;

receiving, from the source of the request, the response for the challenge task;

verifying that the response indicates successful performance of the challenge task and that the additional data was transmitted having the specified length; and authenticating the source of the request as corresponding to a human user.

7. The computer-implemented method of claim 6, further comprising:

transmitting, to a second source of a second request, a second challenge task to be performed and a second indication of a specified length of additional data to be transmitted;

determining, for a received second response, that at least the second challenge task was not successfully completed or the specified length of additional data was not transmitted; and preventing a second operation indicated by the second request from being performed.

8. The computer-implemented method of claim 7, further comprising:

allowing up to a maximum number of retry attempts of one or more challenge tasks before preventing the second operation from being performed.

9. The computer-implemented method of claim 6, further comprising:

selecting the specified length of additional data to have a negligible impact on a legitimate human user submitting a single request on a session but a significant impact in aggregate on an automated requestor submitting a large number of concurrent requests.

10. The computer-implemented method of claim 6, further comprising:

selecting the specified length of additional data to be transmitted based upon a reputation score of the source or a level of suspicion associated with the request.

11. The computer-implemented method of claim 10, wherein the level of suspicion is determined using at least a past behavior of the source or a current threat level for the at least one computing resource.

12. The computer-implemented method of claim 10, wherein a digital fingerprint is determined for a device associated with the source of the request, and wherein the level of suspicion is determined based upon a number of other requests associated with different addresses but having the same digital fingerprint.

13. The computer-implemented method of claim 6, further comprising:

transmitting, with the challenge task, a seed value to be used in generating a random number having a length corresponding to the specified length of additional data; and verifying that the additional data received has an expected value generated using the seed value.

14. The computer-implemented method of claim 6, further comprising:

instructing the source of the request to download the additional data from at least one source.

15. The computer-implemented method of claim 6, further comprising:

performing at least the verifying using a network edge device sitting at an edge of a network containing the at least one computing resource.

16. A system, comprising:

a processor; and memory including instructions that, when executed by the processor, cause the system to:

receive a request to perform an operation using at least one computing resource;

transmit, to a source of the request, a challenge task to be performed and an indication of a specified length of additional data, wherein the additional data is to be transmitted with a response to the challenge task including an indication of performance of the challenge task;

receive, from the source of the request, the additional data and the response to the challenge task including the indication of performance of the challenge task;

verify that the response indicates successful performance of the challenge task and that the additional data was received with the response having the specified length; and authenticate the source of the request as corresponding to a human user.

17. The system of claim 16, wherein the instructions when executed further cause the system to:

transmit, to a second source of a second request, a second challenge task to be performed and a second indication of a specified length of additional data to be transmitted;

determine, for a received second response, that at least the challenge task was not successfully completed or the specified length of additional data was not transmitted with the second response; and prevent a second operation indicated by the second request from being performed.

18. The system of claim 16, wherein the instructions when executed further cause the system to:

allow up to a maximum number of retry attempts of one or more challenge tasks before preventing the second operation from being performed.

19. The system of claim 16, wherein the instructions when executed further cause the system to:

select the specified length of additional data to have a negligible impact on a legitimate human user submitting a single request on a session but a significant impact in aggregate on an automated requestor submitting a large number of concurrent requests.

20. The system of claim 16, wherein the instructions when executed further cause the system to:

transmit, with the challenge task, a seed value to be used in generating a random number having a length corresponding to the specified length of additional data; and verify that the additional data received has an expected value generated using the seed value.

* * * * *